Jan. 13, 1948.  H. M. LINDING  2,434,364
FLY-CATCHER
Filed Jan. 20, 1944
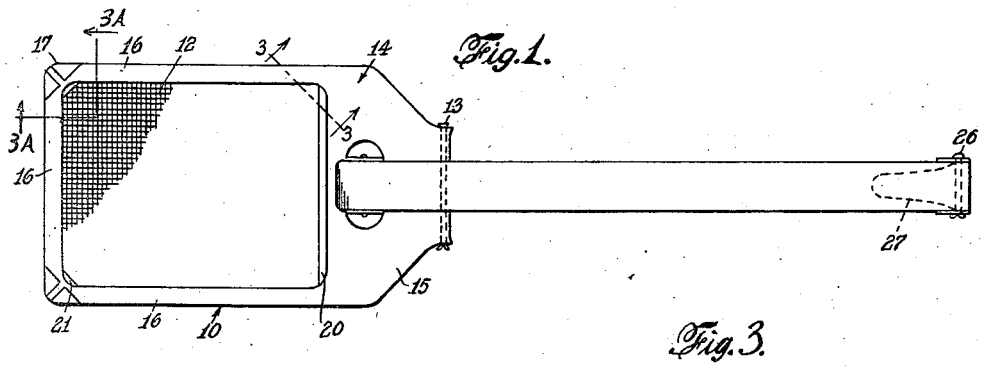
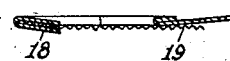
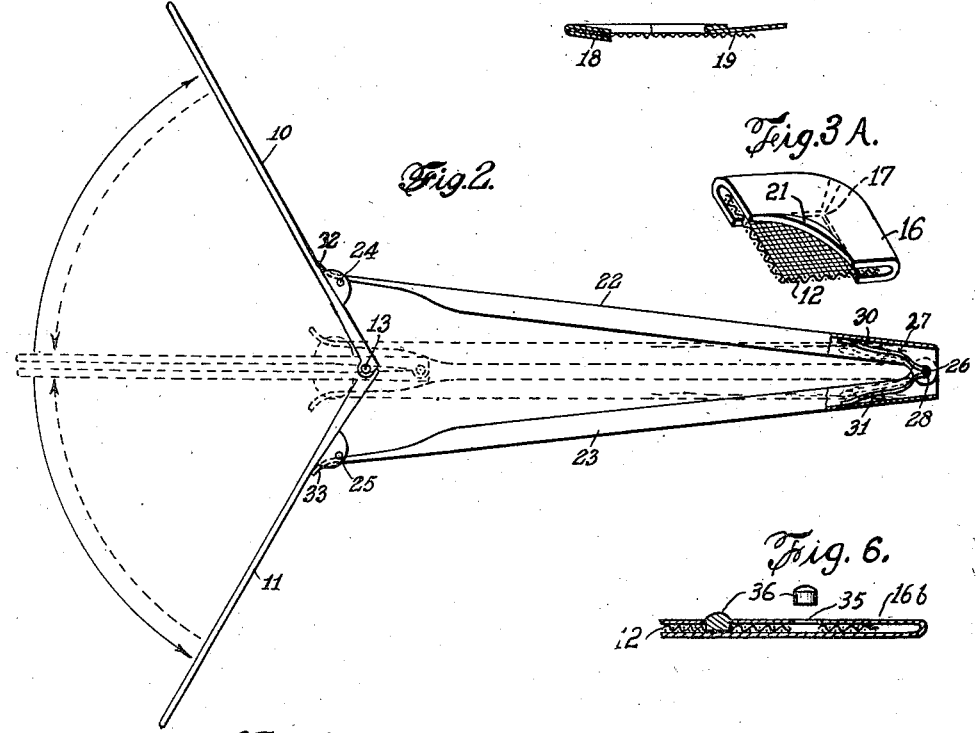
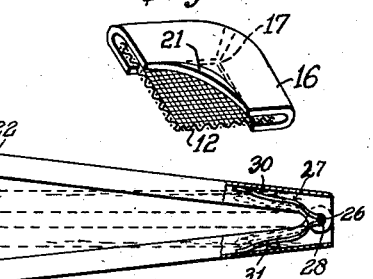
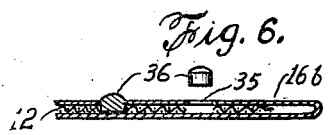
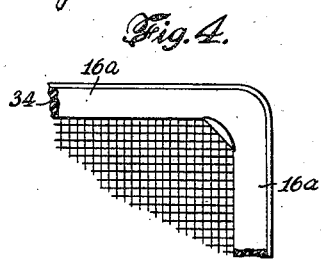
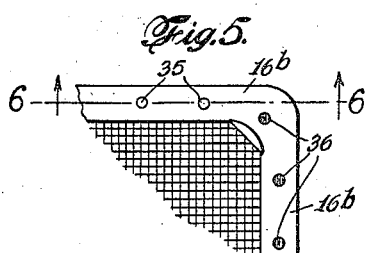
INVENTOR.
HERMAN M. LINDING
BY Robert Irving Williams
ATTORNEY.

Patented Jan. 13, 1948

2,434,364

UNITED STATES PATENT OFFICE 2,434,364

FLY CATCHER

Herman M. Linding, Ossining, N. Y.

Application January 20, 1944, Serial No. 518,939

3 Claims. (Cl. 43—137)

This invention relates to fly-catchers and the like and more particularly to devices for killing flies, wasps, hornets, mosquitoes, and other flying insects, both at rest and on the wing.

An object of the invention is to provide a device of the character described which can be operated with ease and efficiency. Another object is the provision of a device which is sturdy, durable and effective. A further object of the invention in certain of its more specific aspects is the provision of a device which is adapted for the effective and neat killing of insects whether they are on a surface or in the air. Other objects will in part be obvious and will in part appear hereinafter.

The ordinary fly-swatter, in spite of its lack of effectiveness against insects on the wing and in spite of its tendency to cause spots, smudges and similar injuries to the surface against which an insect may be smashed, has, because of the simplicity of its operation, continued to be used in many instances where a plural-member fly-catcher would be far more effective. Many persons have preferred to employ a device which required no special setting operation to prepare it for use. Others have put particular stress on such factors as sturdiness and durability. Still others have stressed the importance of a device which will kill insects at rest.

The present invention, accordingly, aims to provide a single device which combines the advantages of the ordinary fly-swatter and the advantages of devices of catching and killing insects on the wing, such, for example, as disclosed and claimed in my prior Patent No. 1,660,011.

With the foregoing and other considerations in view, the present invention in various of its aspects contemplates the provision of a fly-catcher which can be operated by a single gripping action and which will restore itself to a position ready for a repeated use without any other effort on the part of the operator than the release of his grip, the provision of a fly-catcher which is sturdy and durable and at the same time possesses a maximum of efficiency and effectiveness, and the provision of a fly-catcher which can be effectively used against insects at rest as well as against insects on the wing.

In accordance with the invention there is provided resilient means for maintaining a pair of foraminate members apart and ready for immediate use in killing an insect. This is particularly important in enabling the immediate re-use of the device, without adjustment, before an insect has the opportunity to remove itself to an inaccessible position or a safe situation.

Further in accordance with the invention there are provided frame elements disposed at at least the external portions of the foraminate (generally mesh) operating members. The provision of such means not only greatly increases the sturdiness of the members and consequently enhances the durability of the device as a whole, but also permits insects to be picked off of a number of surfaces without likelihood of tearing or scratching the surface, and at the same time without the likelihood of spotting or smudging the surface with the insect's blood as is the case when an ordinary fly-swatter is used.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, in which:

Figure 1 is a plan view of one type of fly-catcher embodying the invention;

Fig. 2 is a side view thereof showing the device in open position in full lines, and in closed position in dotted lines;

Figs. 3 and 3A are enlarged cross and perspective sectional views along the lines 3—3 and 3A—3A respectively of Fig. 1;

Fig. 4 is an enlarged fragmentary view illustrating a modified type of frame means;

Fig. 5 is a similar view illustrating another modified form of frame means; and

Fig. 6 is a sectional view along the line 6—6 of Fig. 5.

As exemplified, the device comprises a pair of members 10 and 11 adapted to be moved apart ready for use and to be moved together to catch and smash a fly therebetween. Each member embodies a foraminate portion 12 formed preferably of wire mesh or other type of sturdy mesh although other foraminate structures may be employed in certain instances. The fly-catcher members 10 and 11 are pivotally connected in the present instance as indicated at 13. Each of the fly-catcher members includes frame means 14 including a supporting portion 15 and external frame portions 16. In the present instance these frame means are unitary, but it is to be understood that the invention is not limited to unitary frame means. The unitary construction contributes markedly to the sturdiness of the device however. As exemplified, the frame means are composed of metal as are also the legs hereinafter referred to, but they may be composed of any suitable hardened plastic or other suitable structural material. In order to avoid any overlapping at the interior corners of the device, the frame means is cut away as indicated at 17. In order that the foraminate portions 12 may closely approach each other when the members 10 and 11 come together, so as to effectively smash a fly, the internal edges of the frame means 16 are pressed inwardly so that they tend to force the mesh or other foraminate portions toward the interior of the device. In other words, all excess material of the frame means is disposed outwardly of the device rather than in a position where it will interfere with the movement of the two mesh members toward each other; this sloping construction being exemplified with particular clarity at 18 in Fig. 3. The part of the frame portion 15 which is in proximity to the mesh members is similarly sloped inwardly as shown at 19 in Fig. 3. As will be noted, the mesh portions are caught at their external edges within bent-over parts of the frame portion 16, and at their internal edges they merely lie against part of the frame means 15. The edge of the latter is bent over outwardly as indicated at 20 for the purpose of strengthening the device, and tongues at the internal corners of the frame 16 are likewise bent back upon the frame means as indicated at 21.

It is particularly important that each fly-catcher member have a smooth-edged frame portion at one of its side edges, so that the fly-catcher, with the fly-catcher members in open position, may have this side edge moved against a wall on which the insect is resting, and the fly-catcher members brought together against the fly. Because of the smooth-edged frame member the wall will not be torn or marred as the smooth side edges graze it.

It will be appreciated that fly-catcher members such as shown at 10 and 11 may be mounted for movement together and apart by means other than a pivotal connection, and that any of a wide variety of means may be utilized to operate these members. In the present instance there is exemplified means similar to those disclosed in my said Patent 1,660,011 and consisting of legs 22 and 23 pivoted respectively to the members 10 and 11 at 24 and 25, and pivoted to each other by means of a pivot pin 26. As above indicated, the invention contemplates the provision of means for maintaining the fly-catcher members apart, and specifically contemplates the provision of resilient means to effect this purpose. In the present instance this means is operative to spread the legs 22 and 23, and in its preferred form, as exemplified, comprises a leaf spring 27 having a central portion 28 which is folded around the pivot pin 26, and having arms 30 and 31 which press respectively against the legs 22 and 23. As will be seen, the latter are channel-shaped members and the arms 30 and 31 fit within the channel-shaped members so as to be out of the way and well protected from injury.

At the ends of the legs 22 and 23 are lugs 32 and 33 which limit the outward movement of the respective fly-catcher members. It will be noted that these are bent to almost the plane of the members so that the members will seat against these lugs easily and without undue jar.

The device may be formed of metal, plastic, wood or other suitable material, or various combinations thereof.

In order to operate the device, it is merely necessary to bring it to a position where a fly or other insect, whether on the wing or on a surface, is in the space between the fly-catcher members, and to grip the two legs so as to bring the members together. While ordinarily a construction, such as exemplified, where both members of the frame are movable, is desirable, it will be understood that the invention is not limited to construction wherein both members move.

Due to the provision of frame members external to the mesh members, a fly may be readily picked off clothing, walls, table tops, lamp shades, and the like by placing the side edge of the fly-catcher against the surface in question, or in certain instances, by bringing the end edges into spaced proximity with the surface, and operating the device. There is relatively little danger of scratching or tearing any reasonably tough surface and the likelihood of smudging or spotting, which is ever-present in the use of an ordinary fly-swatter, is effectively avoided.

In certain instances it is desirable for the sake of quietness or resiliency, that the frame members be formed of material other than a hard material and with this in view the invention in certain of its aspects, contemplates the formation of all or part of the frame means of rubber or other suitable resilient material, as exemplified at 34 in connection with the frame portion 16a of Fig. 4. Alternatively, sockets may be pressed into a metallic or plastic frame member such as the member 16b of Fig. 5 and buttons of rubber or other resilient material may be pressed into these sockets and allowed to protrude slightly so as to reduce the noise or shock as the members come together. Such sockets are indicated in Fig. 5 at 35 with the buttons removed, and at 36 with the buttons in place.

Devices of the character exemplified have been utilized very effectively, not only against flies, but also against wasps, hornets, mosquitoes, Japanese beetles, and other insects which are difficult to kill by ordinary methods.

I claim:

1. A fly-catcher or the like comprising a pair of foraminate flat plates having contiguous hingedly-connected edges and opposite edges adapted to be moved toward and away from each other, legs hingedly-mounted on the back of the respective plates at points nearer said hinged edges than said opposite edges thereof, a pivotal interconnection for said legs at a greater distance from said points than the respective distances between said hinged edges and said opposite edges of the plates, a spring urging said legs apart, and lugs on the ends of said legs and lying in the path of separating movement of the plates by said legs under the urge of said spring to limit the separating movement of said plates.

2. A fly-catcher or the like comprising a pair of foraminate flat plates having contiguous hingedly-connected edges and opposite edges adapted to be moved toward and away from each other, legs hingedly-mounted on the back of the respective plates at points nearer said hinged edges than said opposite edges thereof, a pivotal interconnection for said legs at a greater distance from said points than the respective distances between said hinged edges and said opposite edges of the plates whereby relative movement of the legs is imparted to the foraminate plates at an increased rate, and a leaf spring having a bent central portion which is adjacent to said pivotal interconnection, with the ends of said spring urging said legs apart to move their outer hinged-end portions away from each other, each of said legs terminating in a curved contour adjacent said foraminate plates and limiting their open position thereby.

3. A fly-catcher or the like comprising a pair of foraminate flat plates having contiguous hingedly-connected edges and opposite edges adapted to be moved toward and away from each other, legs hingedly-mounted on the back of the respective plates at points nearer said hinged edges than said opposite edges thereof, a pivotal interconnection for said legs at a greater distance from said points than the respective distances between said hinged edges and said opposite edges of the plates whereby relative movement of the legs is imparted to the foraminate plates at an increased rate, frame members supporting at least certain of the external edges of the foraminate plates, the mutually adjacent portions of said frame members lying substantially in the planes of said foraminate plates whereby said plates can approach each other closely in insect-crushing position, and yieldable inserts in certain of said frame members and facing toward certain other of said frame members for softening the blow as said members move toward insect-crushing position.

HERMAN M. LINDING.

REFERENCES CITED

The following references are of record in the file of this patent:

UNITED STATES PATENTS

| Number | Name | Date |
| --- | --- | --- |
| 359,890 | Rue | Mar. 22, 1887 |
| 526,479 | Bernard | Sept. 25, 1894 |
| 1,099,342 | Copenhaver | June 9, 1914 |
| 1,233,051 | Gundermann | July 10, 1917 |
| 1,331,443 | Lynch | Feb. 17, 1920 |
| 1,515,158 | Miller | Nov. 11, 1924 |
| 1,650,548 | Sullivan | Nov. 22, 1927 |
| 1,660,011 | Linding | Feb. 21, 1928 |
| 1,664,762 | Voss | Apr. 3, 1928 |
| 2,191,126 | Gustke | Feb. 20, 1940 |